US007545991B2

(12) United States Patent
Kubo

(10) Patent No.: US 7,545,991 B2
(45) Date of Patent: Jun. 9, 2009

(54) IMAGE DATA PROCESSING METHOD AND RECORDING APPARATUS ALLOWING ORIGINAL IMAGE OF BROAD DYNAMIC RANGE TO BE REPRODUCED

(75) Inventor: Naoki Kubo, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1119 days.

(21) Appl. No.: 09/986,721

(22) Filed: Nov. 9, 2001

(65) Prior Publication Data

US 2002/0057903 A1 May 16, 2002

(30) Foreign Application Priority Data

Nov. 10, 2000 (JP) ............................. 2000-343456

(51) Int. Cl.
*G06K 9/46* (2006.01)
(52) U.S. Cl. ..................... 382/237; 382/236; 345/600; 345/601; 345/602; 345/603; 345/604; 345/605
(58) Field of Classification Search ................ 382/166, 382/251, 270–273, 305, 236, 237; 348/405, 348/387.1, 390.1; 345/600–605; 358/426.1; 375/363; 707/102
See application file for complete search history.

(56) References Cited

U.S. PATENT DOCUMENTS 4,797,742 A * 1/1989 Sugiyama et al. ...... 375/240.02
5,892,847 A * 4/1999 Johnson ...................... 382/232
6,332,030 B1 * 12/2001 Manjunath et al. .......... 382/100
6,775,407 B1 * 8/2004 Gindele et al. .............. 382/166
6,778,187 B1 * 8/2004 Yi .............................. 345/605

FOREIGN PATENT DOCUMENTS

JP          A6-90380          3/1994

* cited by examiner

*Primary Examiner*—Matthew C Bella
*Assistant Examiner*—Dennis Rosario
(74) *Attorney, Agent, or Firm*—Birch, Stewart, Kolasch & Birch, LLP

(57) ABSTRACT

An image data processing method transforms a picture signal having a broad dynamic range to another picture signal having a narrow dynamic range. The picture signal having the narrow dynamic range is subjected to inverse transform to thereby output a recovered signal having the broad dynamic range. A difference between the original picture signal and the recovered signal, both having the broad dynamic range, is produced and then stored in a recording medium as difference data. A parameter for software processing to be executed for reproduction of the original picture signal later is also stored in the recording medium. In this way, the method can transform the original data with the broad dynamic range to the data of a standard file format with the narrow dynamic range, record the transformed data, and allow the original data to be recovered and effectively used later, as desired.

12 Claims, 10 Drawing Sheets

IMAGE DATA PROCESSING METHOD AND RECORDING APPARATUS ALLOWING ORIGINAL IMAGE OF BROAD DYNAMIC RANGE TO BE REPRODUCED

BACKGROUND OF THE INVENTION

1. Field of the Invention

The present invention relates to a method of processing image data and an apparatus for recording image data advantageously applicable to a digital still camera or the like for forming image data and recording the image data.

2. Description of the Background Art

Conventional solid-state image pickup devices, e.g., CCD (Charge Coupled Device) image sensors had a dynamic range far narrower than a latitude particular to silver halide photosensitive type of films and other traditional photosensitive materials. Today, a solid-state image pickup device with a broad dynamic range is available because of the rapid progress of semiconductor fabrication technology and that of broad dynamic range shooting technology, e.g., multiple exposure shooting.

Various schemes have been proposed for promoting the effective use of raw data having a broad dynamic range. Japanese patent laid-open publication No. 90380/1994, for example, discloses a procedure that compresses image data with a knee curve by analog processing and then expands the compressed image data with an inverse knee curve by digital processing to thereby obtain image data having a broad dynamic range.

To record image data representative of a scene picked up and having a broad dynamic range in the form of a digital picture signal, use is made of a defacto, standard file format, e.g., BMP (Bit MaP)), TIFF (Tag Image File Format) or JPEG (Joint Photographic Experts Group) format. Today's defacto, standard file format has a dynamic range whose unit data (pixel data in the case of a picture) consists of eight bits because an eight-bit dynamic range is a defacto, standard dynamic range adopted by the above typical formats. In the future, the standard file format may be replaced with another format having a different standard dynamic range.

At the present stage of development, for conversion to the standard file format, pixel data represented by an RGB (Red, Green and Blue) model or similar data model must be rendered by a preselected number of quantizing levels, i.e., eight-bit levels at the present stage. As for an RGB model, for example, an R, a G and a B channel constituting pixel data each are represented by eight-bit levels, e.g., 255 quantizing levels.

However, the problem with the conversion using a preselected number of quantizing levels is that the original image data with a broad dynamic range looses essential part thereof having high accuracy, i.e., represented with a great number of quantizing levels. The high-accuracy data lost cannot be recovered in the event of reproduction to be effected by software processing later. Particularly, software processing for enhancing the gain of the dark portion of a picture cannot be executed with accuracy above eight bits.

Assume that data with a great number of quantizing levels, e.g., twelve-bit data is recorded in order to effectively use the entire data having a broad dynamic range. Then, such data do not adapt to the standard file format described previously and cannot be transformed to the JPEG or similar compressed format. Moreover, the data with the great number of quantizing levels occupy a broad space in a memory.

SUMMARY OF THE INVENTION

It is an object of the present invention to provide an image data processing method and recording apparatus allowing original data of a broad dynamic range to be effectively used later, as desired.

In accordance with the present invention, a method of processing image data begins with a step of transforming broad-range image data having a broad dynamic range to narrow-range image data narrower in dynamic range than the broad-range image data. The narrow-range image data are inversely transformed to output inversely transformed image data having the same dynamic range as the broad-range image data. Difference data is then calculated representative of a difference between the broad-range image data and the inversely transformed image data. A file is generated that relates at least the difference data, information relating the difference data to the step of transforming and the narrow-range image data to one another.

Also, in accordance with the present invention, an image data recording apparatus includes at least one image processing circuitry and a storage. The image processing circuitry includes a transforming circuit for transforming input image data to output image data having a smaller number of quantizing levels than the input image data and feeding the output image data to another image processing circuitry. An inverse transforming circuit inversely transforms the output image data to thereby produce inversely transformed image data having the same dynamic range as the input image data. A calculating circuit produces difference data representative of a difference between the input image data and the output image data by calculation. The image processing circuitry therefore transforms broad-range image data having a broad dynamic range to narrow-range image data narrower in dynamic range than the broad-range image data. At least the narrow-range image data, difference data and information relating the difference data to the transforming circuit are recorded in the storage while being related to one another.

BRIEF DESCRIPTION OF THE DRAWINGS

The objects and features of the present invention will become more apparent from consideration of the following detailed description taken in conjunction with the accompanying drawings in which:

FIG. 3 shows how to combine FIGS. 3A and 3B;

DESCRIPTION OF THE PREFERRED EMBODIMENT

Figure 1:
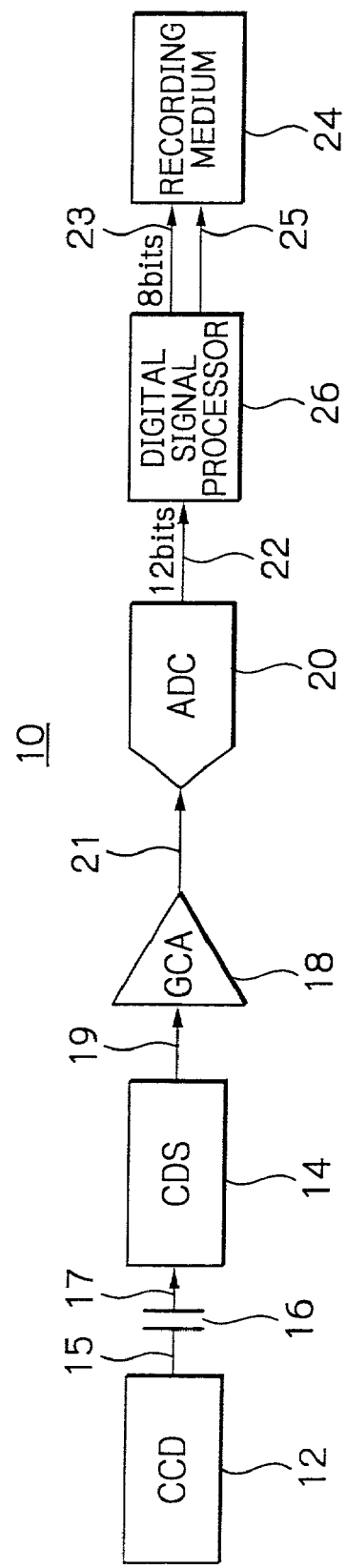
FIG. 1 is a schematic block diagram showing an embodiment of an image data recording apparatus in accordance with the present invention.

Referring to FIG. 1 of the drawings, an image data recording apparatus embodying the present invention is implemented as a digital still camera by way of example. In FIG. 1, part of the digital still camera not directly relevant to the understanding of the present invention is not shown. Signals are designated by reference numerals attached to signal lines on which they appear. As shown, the digital still camera, generally 10, includes a CCD image sensor or solid-state image pickup device 12 having a broad dynamic range. The CCD image sensor 12 has an output 15 connected to the input of a CDS (Correlated Double Sampling) circuit 14 via a capacitor 16. The CDS circuit 14 plays the role of a noise reducer for reducing reset noise output from the CCD image sensor 12.

The CDS circuit 14 has an output 19 connected to a GCA (Gain Controlled Amplifier) 18 for gain control. The GCA 18 has an output 21 connected to an ADC (Analog-to-Digital Converter) 20. The ADC 20 converts an analog image signal 21, which is output from the GCA 18, to a digital RGB image signal 22. The digital RGB image signal 22 has a relatively great number of quantizing levels, i.e., twelve bits. The digital image signal 22 is input to a digital signal processor 26.

The digital signal processor 26 executes various kinds of digital signal processing in order to transform the digital image signal 22 to a standard file format, as will be described specifically later. As a result, the digital image signal 22 is transformed to image data 23 having a smaller number of quantizing levels than the image signal 22. In the illustrative embodiment, the number of quantizing levels of the image data 23 is assumed to be eight bits. Such transform executed by the digital signal processor 26 is generally classified into linear processing and nonlinear processing, as will be described later. Although the image data 23 mentioned above has an eight-bit dynamic range predominant in the state-of-the-art imaging technologies, the number of quantizing levels thereof can be freely selected in accordance with the possible future standard file format.

The digital signal processor 26 outputs difference data 25 in addition to the image data 23. The difference data 25 is representative of a difference between the original or non-processed image signal and the processed image signal and has heretofore been lost due to transform of the processor 26, as will be described more specifically later. The image data 23 and difference data 25 both are input to recording medium, e.g., an optical disk or a magnetic disk.

The camera 10 shown in FIG. 1 may use any suitable solid-state image pickup device other than the CCD image sensor 12, if desired. The illustrative embodiment is not limited to a digital still camera, but may be implemented as any other image data recording apparatus dealing with an image signal. The illustrative embodiment is therefore applicable to any system so long as it includes an image signal inputting means and a recording means and has a standard file format. For example, the illustrative embodiment is applicable even to a system not including a CCD image sensor or similar image pickup device. In that case, the system will record an original or non-processed image signal input thereto in an image data recording apparatus via a removable recording medium or some communicating means.

Figure 2:
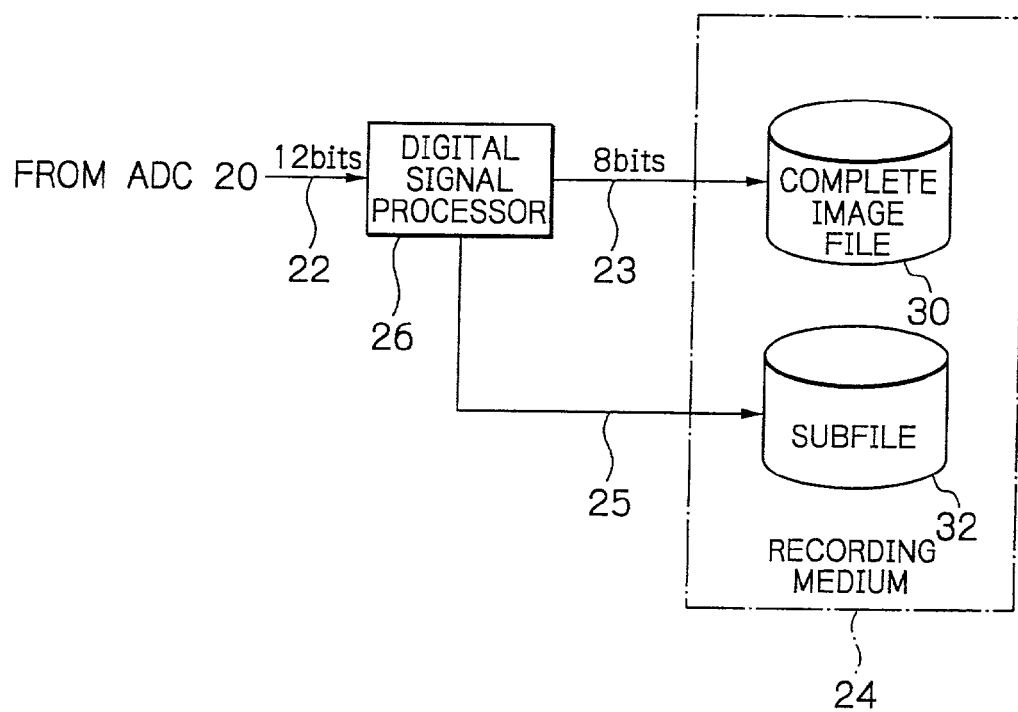
FIG. 2 is a block diagram showing the digital signal processor and the recording medium included in the illustrative embodiment shown in FIG. 1.

FIG. 2 shows the digital signal processor 26 and recording medium 24 included in the illustrative embodiment more specifically. As shown, the digital signal processor 26 processes the input image signal 22 to thereby generate a complete image file 30 and a subfile 32. The complete image file 30 and subfile 32 are written to the recording medium 24 independently of each other. The complete image file 30 is representative of the picture signal having the standard format and provided with eight-bit accuracy as conventional. The subfile 32 includes the difference between the complete image file 30 and the original image signal 22.

It has been customary with digital signal processing to round off data having a great number of quantizing levels to data having a small number of quantizing levels by omitting the details of the data. By contrast, the illustrative embodiment records the difference data 32 heretofore discarded in the recording medium 24 together with the complete image file 30, so that the original data 22 can be reproduced by software, not shown, later. This makes it possible to effectively use the broad dynamic range originally prepared with the CCD image sensor 12.

Figure 3A:
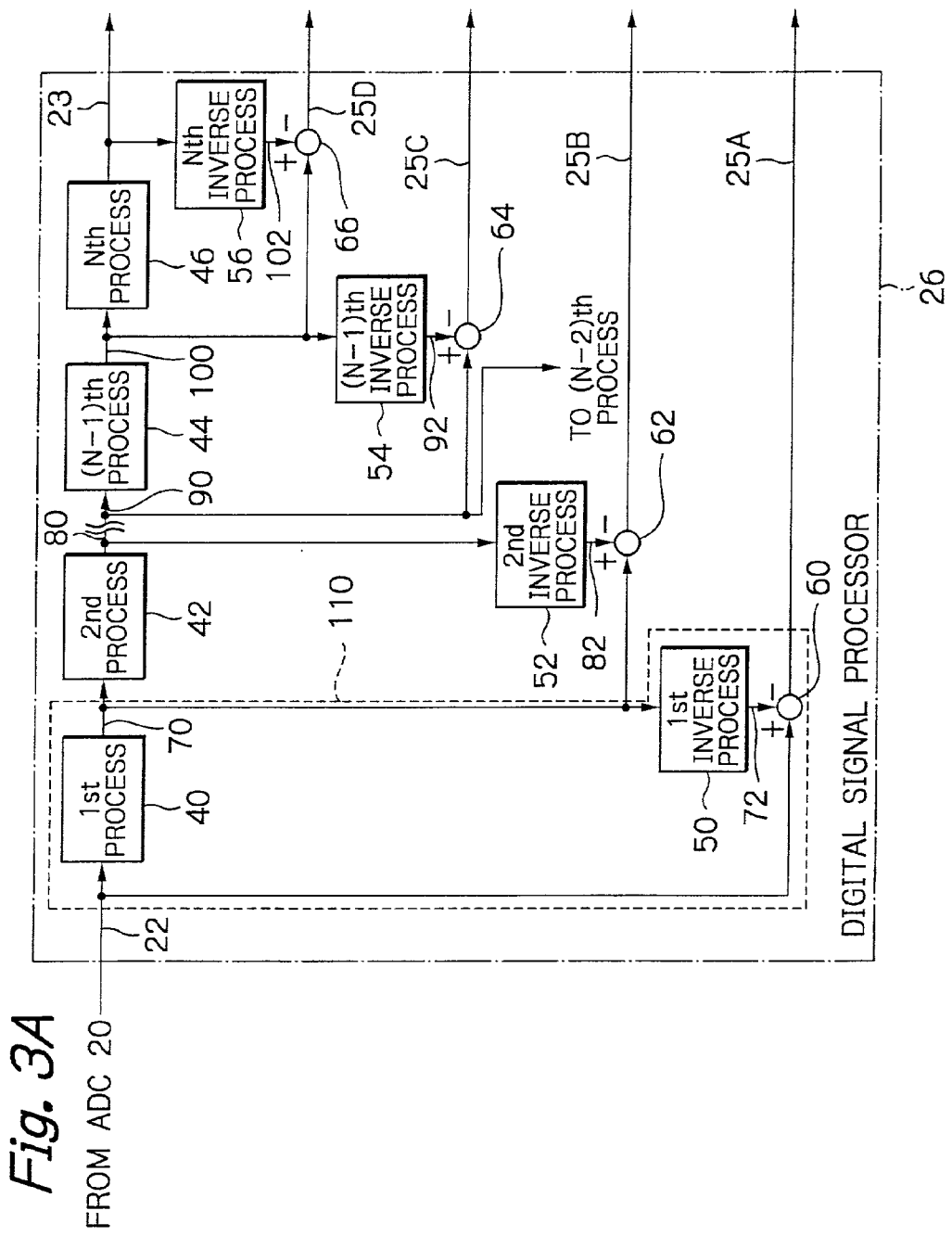
FIGS. 3A and 3B are, when combined as shown in FIG. 3, a schematic block diagram showing the digital signal processor and the recording medium shown in FIG. 2 more specifically.
Figure 3B:
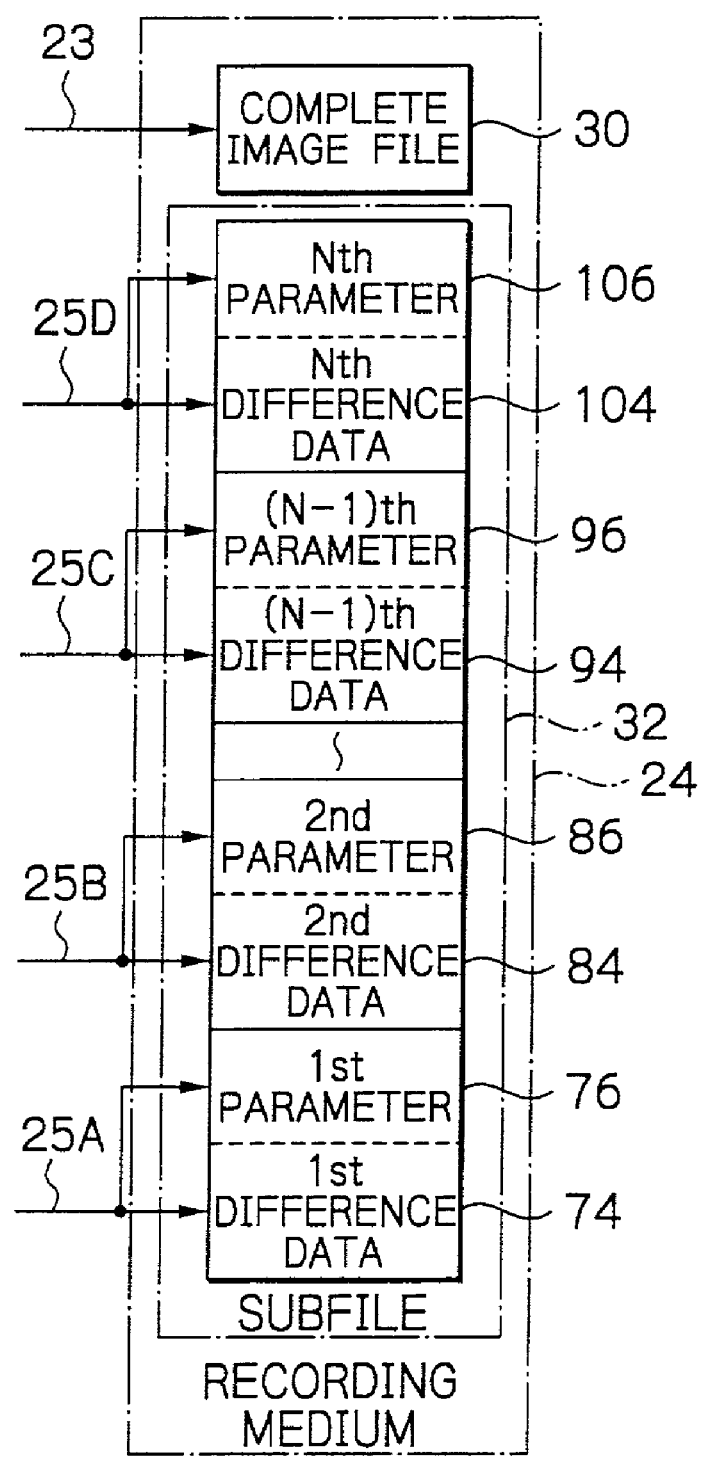

Reference will be made to FIGS. 3A and 3B for describing the digital signal processor 26 in detail. As shown, the processor 26 includes N (1 or greater natural number) processing circuits, i.e., a first, a second, an (N−1)th and an Nth processing circuit 40, 42, 44 and 46. The processor 26 further includes N inverse processing circuits, i.e., a first, a second, an (N−1)th and an Nth inverse processing circuit 50, 52, 54 and 56 associated with the processing circuits 40, 42, 44 and 46, respectively. The processor 26 additionally includes N difference calculators, i.e., difference calculators 60, 62, 64 and 66.

Let the configuration and operation of the processor 26 be described by taking the first processing circuit 40, first inverse processing circuit 50 and difference calculator 60 by way of example. The picture signal 22 with the broad dynamic range is input to the first processing circuit 40. The first processing circuit 40 processes the picture signal 22 by linear or nonlinear processing. The first inverse processing circuit 50 inversely transforms a processed picture signal 70 output from the first processing circuit 40. The resulting output or inversely transformed signal 72 of the inverse processing circuit 50 and the original picture signal 22 are input to the difference calculator 60. The difference calculator 60 produces a difference between the original picture signal 22 and the recovered picture 72.

More specifically, the first processing circuit 40 discards information contained in the picture signal 22 and attained by taking advantage of the broad dynamic range thereof, typically details represented by the lower bits of the picture signal 22. The picture signal 70 output from the first processing circuit 40 is input to both of the second processing circuit 42 and first inverse processing circuit 50. Even though the inverse processing circuit 50 executes inverse transform with the picture signal 70, it cannot recover part of the information discarded by the first processing circuit 40. In the illustrative embodiment, the difference calculator 60 produces a difference between the original picture signal 22 and the recovered picture signal 72 restored by inverse transform and records the difference in the recording medium 24 as first difference data 74. That is, the discarded data is recovered and stored in the recording medium 24.

The difference calculator 60 subtracts the recovered signal 72 from the original picture signal 22. This is because it is known beforehand that the recovered signal 72 output from the inverse processing circuit 50 contains a smaller amount of information than the original picture signal 22.

Further, the difference calculator 60 attaches to the first difference data 74 a first parameter 76 representative of the source of the difference data 74, whereby it is recognized that the difference data 74 is derived from the first processing circuit 40. For example, the first parameter 76 may be "1", which is an ordinal number assigned to the processing circuit 40, or the parameter of processing executed by the processing circuit 40. The parameter 76 therefore shows correspondence between the difference data 74 and the first processing circuit 40. The parameter 76 is written to the recording medium 24 via a signal line 25A together with the difference data 74.

As stated above, the illustrative embodiment records not only the difference data 74 but also the parameter 76 meant for software processing that may be executed to reproduce the original picture signal later. The difference data 74 and parameter 76 stored in the recording medium 24 allow the original picture signal 22 with the broad dynamic range to be fully reproduced by software processing later, although not shown or described specifically. More specifically, the parameter 76 shows that the difference data 74 has been derived from the processing of the first processing circuit 40. Therefore, it is understood that the picture signal 22 input to the processing circuit 40 can be fully restored by inversely transforming the picture signal 70 input to the second processing circuit 42 with the inverse processing circuit 50 and further by adding to the result of inverse transform the difference data 74.

The second to Nth processing circuits 42, 44 and 46, like the first processing circuit 40, respectively execute digital processing with input picture signals 70, 80, 90 and 100. The difference calculators 62, 64 and 66 output difference data 84, 94 and 104, respectively. The difference data 84, 94 and 104 are also written to the recording medium 24 together with a second parameter to an Nth parameter 86, 96 and 106, respectively. In this manner, the difference data 74, 84, 94 and 104 and parameters 76, 86, 96 and 106 are recorded in the recording medium 24 as a subfile 32 independent of the complete image file 30. The parameters 86, 96 and 106 may also be ordinal numbers assigned to the second to Nth processing circuits 42, 44 and 46, respectively.

As stated above, the parameters 76, 86, 96 and 106 show correspondence between the processing circuits 40, 42, 44 and 46 and the difference data 74, 84, 94 and 104, respectively. All the data stored in the subfile 32 may be sequentially applied to the image data, which are included in the complete image file 30 and having the standard format, in an order opposite to the order in which they are generated. This allows the original picture data 22 input to the first processing 40 to be fully reproduced, as desired.

Figure 4:
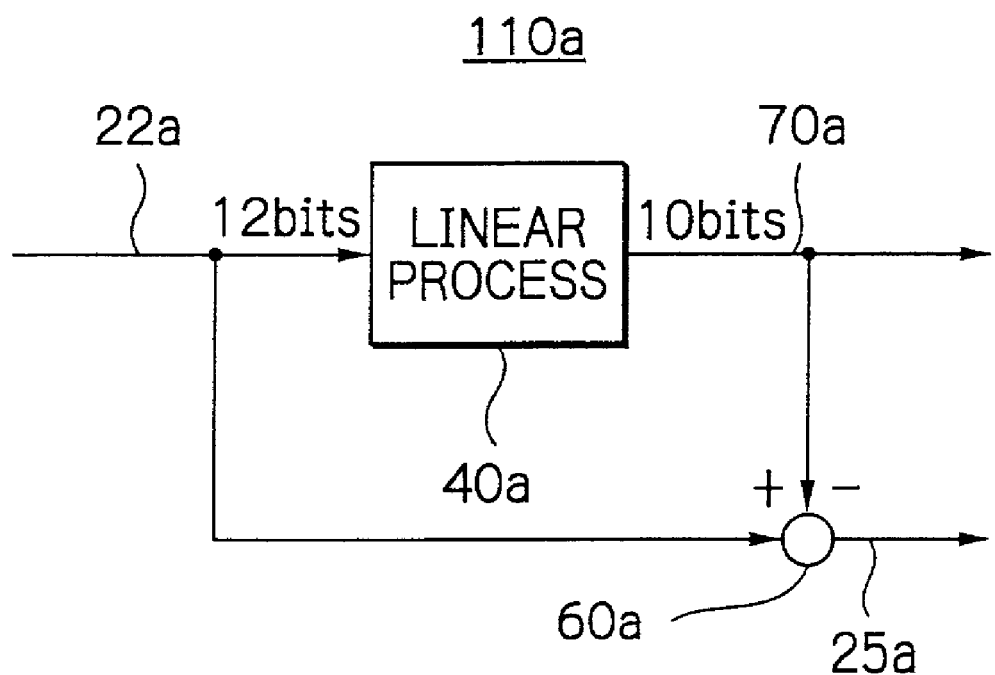
FIG. 4 demonstrates linear process unique to the illustrative embodiment.

The processing to be executed by each of the first to Nth processing circuits 40, 42, 44 and 46 will be described hereinafter. While the processing is either linear or nonlinear, linear processing will be described first with reference to FIG. 4. FIG. 4 shows processing circuitry 110a, corresponding to part 110 of FIGS. 3A and 3B surrounded by a dotted line. As shown, the processing circuitry 110a includes a linear processing circuit 40a that is assumed to be the first processing circuit 40, FIG. 3A, by way of example. The linear processing circuit 40a receives a twelve-bit picture signal 22a and feeds a ten-bit data 70a to a difference calculator 60a. The original picture signal 22a is input to the difference calculator 60a as well.

Figure 5:
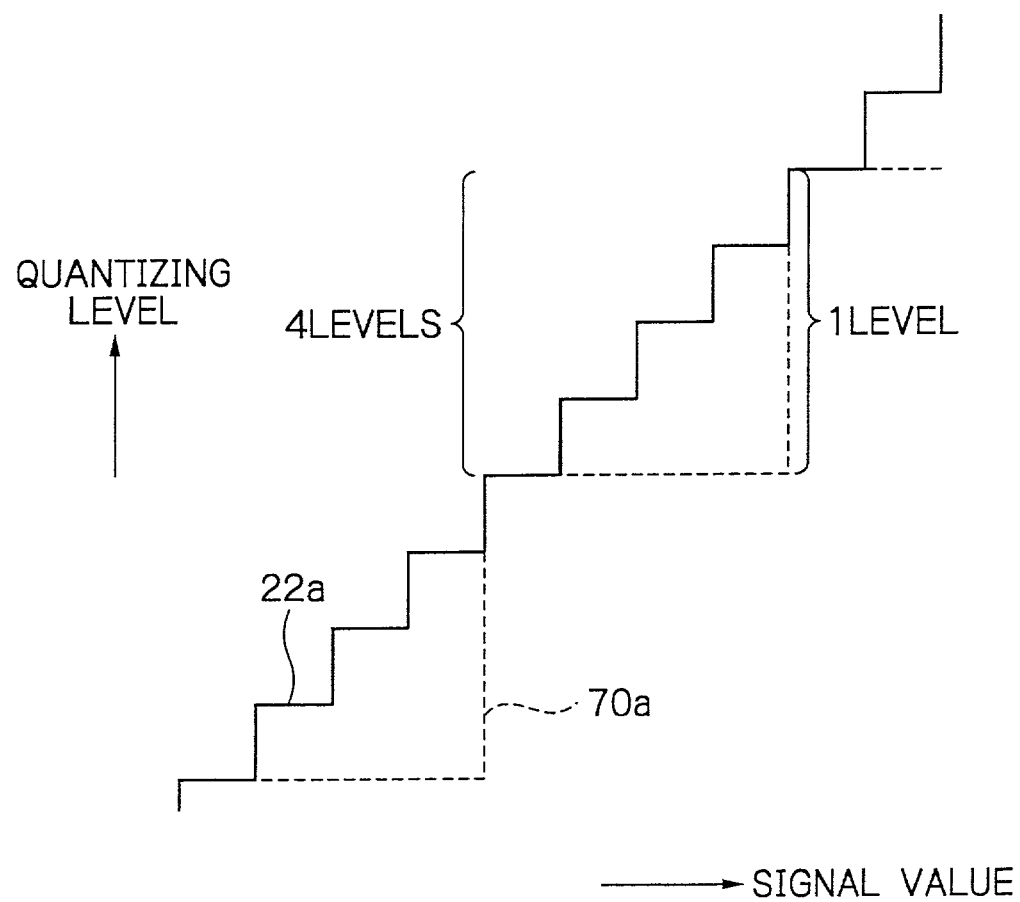
FIG. 5 is a schematic diagram showing quantizing level transformation executed by the linear processing of FIG. 4.

Typical linear processing transforms a picture signal represented by a great number of quantizing levels to a picture signal represented by a small number of quantizing levels. The linear processing circuit 40a executes such linear processing. For example, assume that the picture signal 22a input to the processing circuit 40a has twelve bits and should be transformed to the picture signal 70a having ten bits. Then, twelve bits can render 4,095 levels while ten bits can render 1,023 levels, meaning that the number of levels is compressed to one-fourth. More specifically, as shown in FIG. 5, the picture signal 22a represented by fine levels (solid line) is transformed to the picture signal 70a having rough levels (dotted line). That is, four consecutive levels of the original picture signal 22a are rounded off to a single level of the transformed signal 70a. As a result, the original picture signal 22a looses part of its information representative of details that are previously presented in the lower bits of the broad dynamic range.

A specific operation of the linear processing circuit 40a, FIG. 4, will be described hereinafter. Let binary notation be represented by bracket expression "[ ]$_2$" for convenience. Assume that the original picture signal 22a input to the processing circuit 40a is twelve-bit data $[101000101101]_2 = 2,605$. Then, when the twelve-bit data is divided by 4 and rounded off, the resulting ten-bit data 70a is $[1010001011]_2 = 651$. Therefore, even if the ten-bit data 70a is multiplied by 4 by inverse processing (not shown in FIG. 4), only data $[101000101100]_2 = 2,604$ short of the original data 2,605 is recovered. However, difference data 25a, which is $[01]_2$, representative of a difference between the original data 22a and the inversely processed data is available in the recording medium 24. The original data 22a can therefore be fully restored if $[01]_2$ is added to $[101000101100]_2$.

As stated above, linear processing can produce a difference with an extremely simple configuration. The input 22a to the processing circuit 40a is the original twelve-bit data $[101000101101]_2$. On the other hand, the output 70a from the processing circuit 40a is ten-bit data $[1010001011]_2$ in the form without the lower two bits of the input 22a. The difference calculator 60a subtracts the data 70a from the data 22a while aligning the uppermost bits of the data 22a and 70a. In a strict sense, before the subtraction, the data 70a must be subjected to processing corresponding to the inverse processing described previously, i.e., adding (logical) ZEROs to two lower bits to thereby output $[101000101100]_2$. However, this extra step is not necessary because the difference calculator 60a always aligns the uppermost bits of the data 22a and 70a at the time of subtraction. FIG. 4 shows such simplified circuitry. The difference 25a can be obtained also by simply dividing the input data 22a into upper bits and lower bits, although not shown or described specifically.

Figure 6:
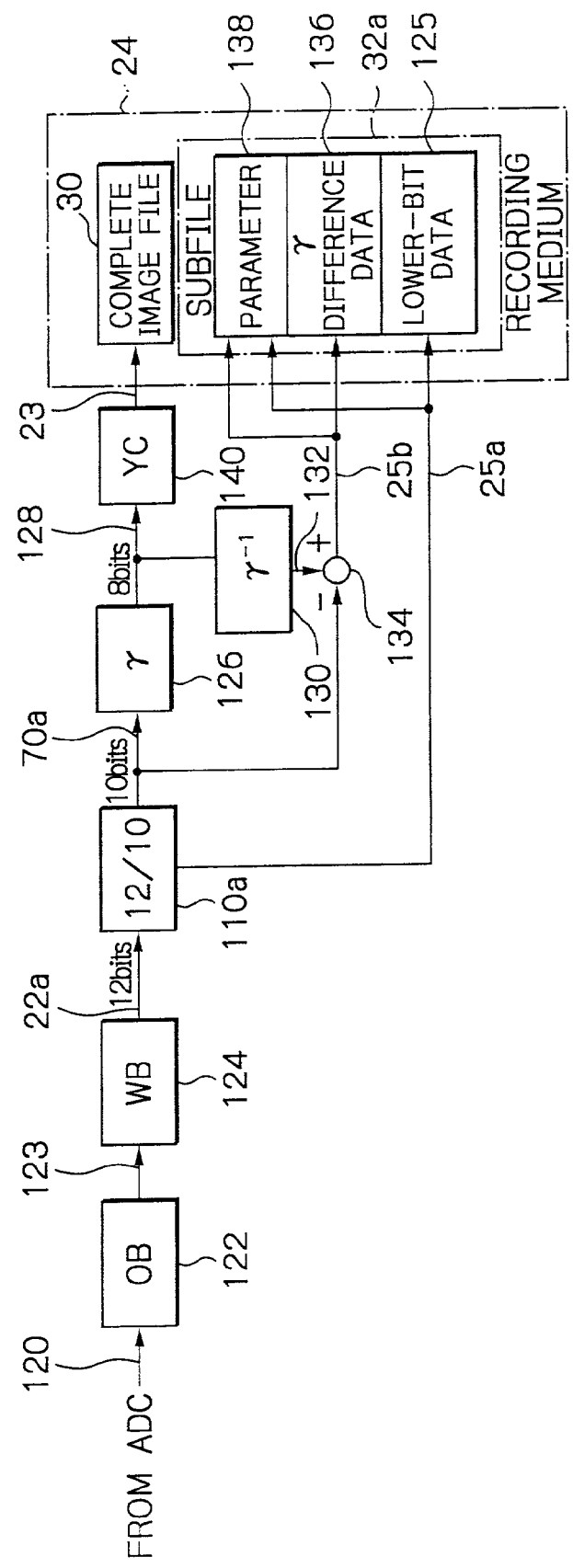
FIG. 6 is a schematic block diagram showing a more specific configuration of the illustrative embodiment.

Nonlinear processing will be described with reference to FIG. 6, which shows a more specific configuration of the circuitry shown in FIG. 1. In FIG. 6, an input picture signal 120 is assumed to have already been digitized by the ADC circuit 20, FIG. 1. As shown, the image signal 120 is input to an OB (Optical Black) processor 122. The OB processor 122 produces reference black data from the optical black portion of the image signal 120. The resulting reference black data 123 is input to a WB (White Balance) processor 124. The WB processor 124 controls white balance such that white included in a picture appears to be white to eye with natural color balance. The OB processor 122 and WB processor 124 do not reduce the number of bits of the picture signal 120 at all.

The output 22a of the WB processor 124 is input to a 12/10 processor 110a that executes the linear processing described with reference to FIG. 4. The output 70a of the 12/10 processor 110a is input to a γ corrector 126 that executes nonlinear processing. The 12/10 processor 110a directly writes difference data 125 in the recording medium 24. The difference data 125 derived from the linear processing is apparently the lower bits simply omitted from 12-bit data 22a as described with reference to FIG. 4. In this sense, the difference data 125 will be referred to as lower-bit data 125 hereinafter.

As for the nonlinear processing, the γ corrector 126 produces a 1/γ-power of the input picture signal 70a in accordance with a value γ particular to a following display or similar receiver, not shown, that projects a picture. This successfully provides a picture appearing relatively dark on the receiver with sufficient lightness.

Figure 8A:
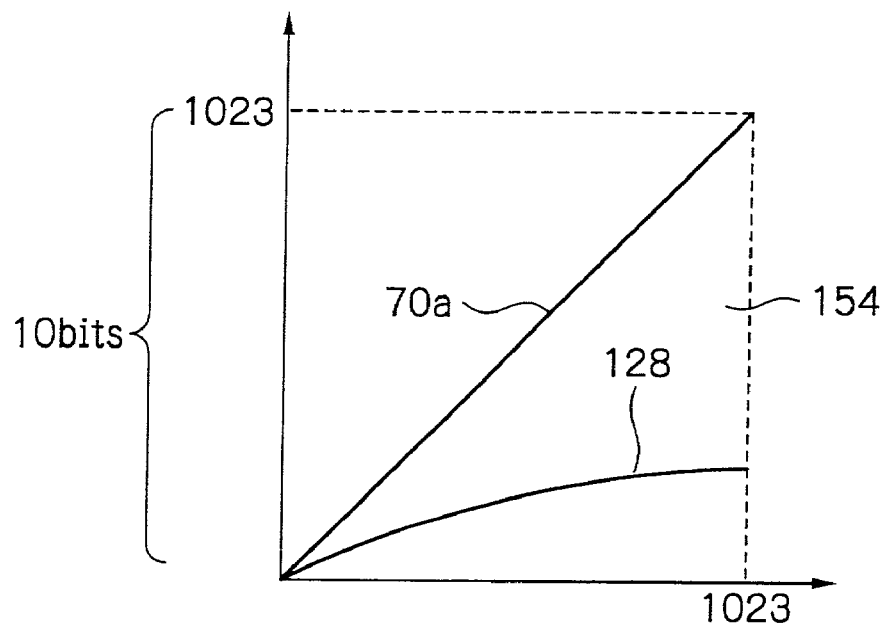
FIG. 8A is a graph plotting data before and after γ conversion.

As shown in FIG. 8A, in the illustrative embodiment, while the signal 70a input to the γ corrector 126 has ten bits (1,023 levels), the signal 128 output from the gamma corrector 126 has eight bits (255 levels). A $γ^{-1}$ processor 130 is connected to the output 128 of the γ corrector 126 for inversely transforming the picture signal 128 corrected to the eight-bit data. The γ corrector 126 and $γ^{-1}$ processor 130 therefore cooperate to execute nonlinear processing in the same manner as linear processing as a whole.

The ten-bit data 70a and data 132 output from the $γ^{-1}$ processor 130 are input to a difference calculator 134. The difference calculator 134 subtracts the data 132 from the data 70a to thereby output difference data 136. In addition, the difference calculator 134 attaches a parameter 138 including the ordinal number of the γ corrector 126 to the difference data 136.

A YC processor 140 is also connected to the output 128 of the γ corrector 126. The YC processor 140 transforms the picture data 128, which is in the form of RGB model, to the data 23 represented by a luminance component (Y) and color components (C). The YC image data 23 is recorded in the recording medium 24 in the form of the complete image file 30 having the standard format, e.g., JPEG format. As for the JPEG format, use is made of a reversible compression system that allows the original data to be restored by expansion.

The operation of the circuitry shown in FIG. 6 will be described hereinafter. The WB processor 124 following the OB processor 122 outputs twelve-bit picture data 22a. The 12/10 processor or linear processor 110a transforms the picture data 22a to ten-bit data 70a. At the same time, the 12/10 processor 110a records the lower-bit data 125 representative of the lower two bits of the data 22a in the recording medium 24. The γ corrector 126 further reduces the number of quantizing levels of the ten-bit data 70a nonlinearly and outputs eight-bit data 128. The $γ^{-1}$ processor 130 inversely transforms the eight-bit data 128 to thereby output data 132, which is short of the original ten-bit data 70a as in the case of linear processing. The difference calculator 134 therefore produces a difference between the data 70a input to the γ corrector 126 and the data 132 and records the difference in the recording medium 24 as difference data 136.

The difference calculator 134 adds a parameter 138 including the ordinal number of the γ corrector 126 to the difference data 136. The difference calculator 134 delivers the parameter 138 to the recording medium 24 via a signal line 25b. Consequently, the lower-bit data 125, difference data 136 and parameter 138 are stored in the recording medium 24 as a subfile 32a.

The picture signal 128 subjected to γ correction is input to the YC processor 140 as well. The YC processor 140 records its output 23 in the recording medium 24 as a complete image file 30 having the standard format. Software processing, not shown or described, expands the complete image file 30 later, executes inverse YC processing with the expanded image file 30, and sequentially applies the information of the subfile 32a in the inverse way. This allows the picture signal 70a input to the γ correction 126 and therefore the original picture signal 22a to be fully reproduced.

Figure 7:
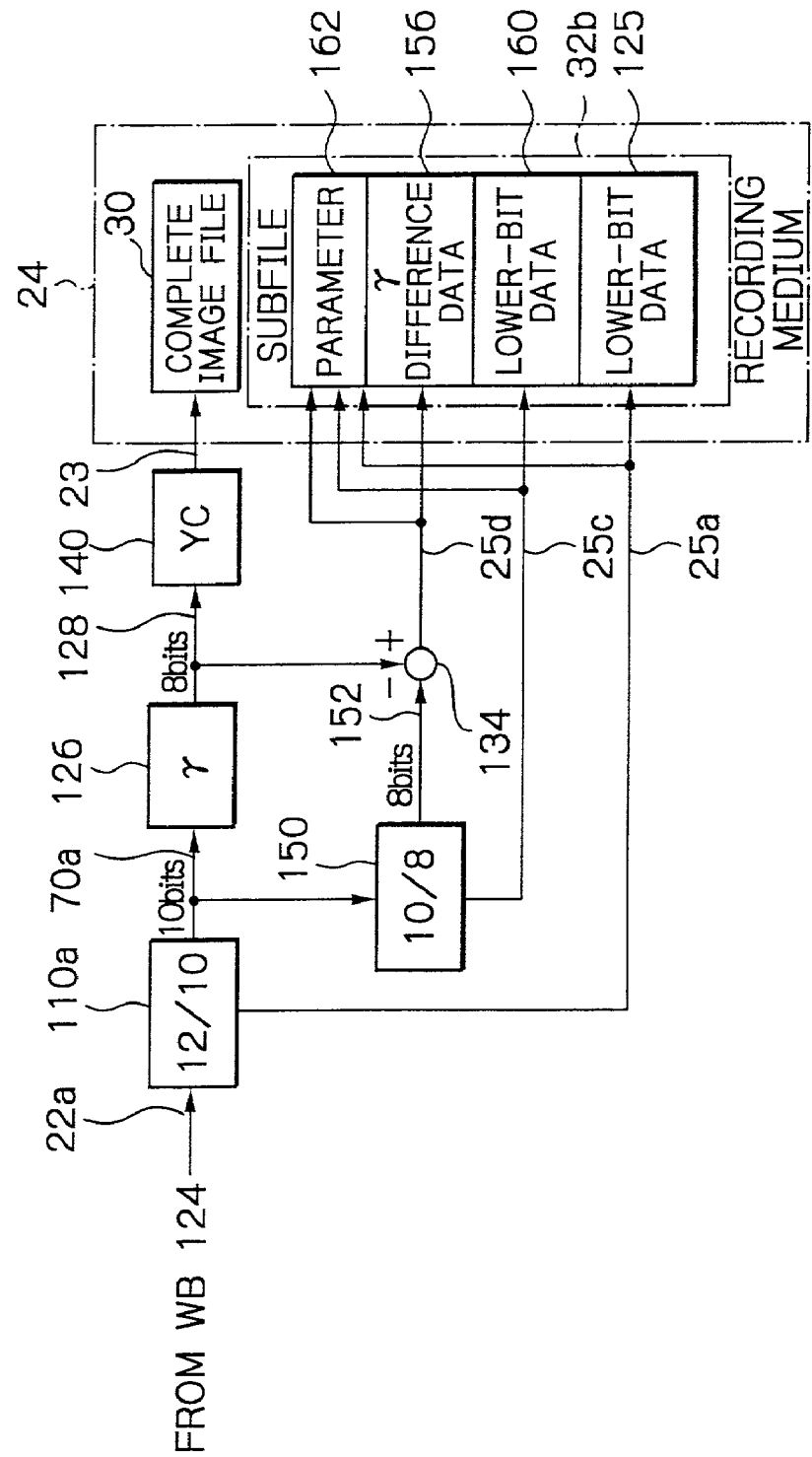
FIG. 7 is a block diagram showing another more specific configuration of the illustrative embodiment.

Another more specific configuration of the circuitry shown in FIGS. 3A and 3B will be described with reference to FIG. 7. In FIG. 7, structural elements identical with those shown in FIG. 6 are designated by identical reference numerals; the WB processor 124 and blocks preceding it are not shown. The circuitry of FIG. 7 is identical with the circuitry of FIG. 6 up to the 12/10 processor 110a that outputs the lower-bit data 125. The circuitry of FIG. 7 does not include the $γ^{-1}$ processor 130, but directly inputs the eight-bit data 128 output from the γ corrector 126 to the difference calculator 134. Also, the ten-bit picture signal 70a output from the 12/10 processor 110a is input to a 10/8 processor 150. The 10/8 processor 150 further reduces the ten-bit picture data 70a to eight-bit picture data 152 and feeds the data 152 to the difference calculator 134.

Figure 8B:
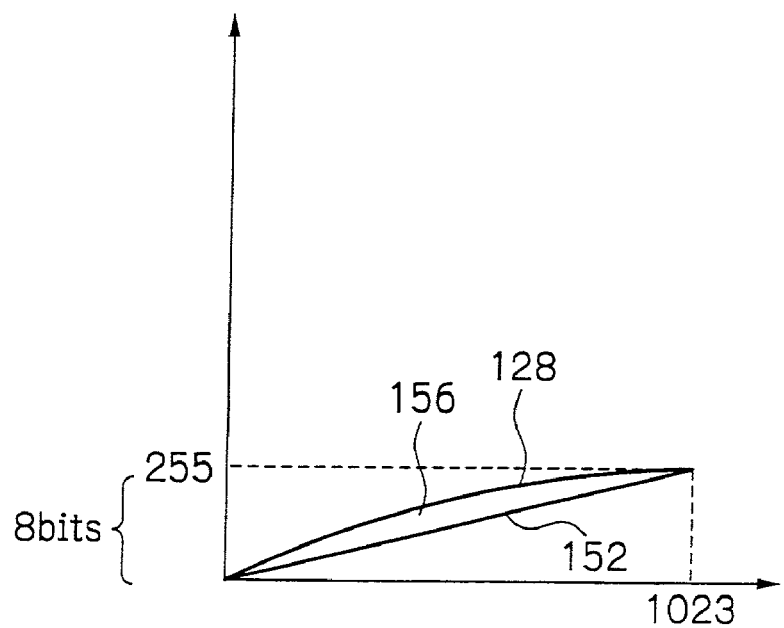
FIG. 8B plots data after γ conversion and data output from a 10/8 processor included in the configuration of FIG. 7.

The significance of the circuitry shown in FIG. 7 will be described with reference to FIGS. 8A and 8B. As shown in FIG. 8A, the corrected picture signal 128 has eight bits. Therefore, when a difference between the picture signal 128 and the ten-bit data not subjected to γ correction is produced, difference data occupies an area 154 at least of ten bits as shown in FIG. 8A and therefore needs a substantial memory space for storage. In light of this, in FIG. 8B, the 10/8 processor 150 reduces the ten-bit data 70a to the eight-bit data 152. In this case, as shown in FIG. 8B, the difference data represented by an area 156 has eight bits or less and therefore reduces the space for storage.

In operation, the 12/10 processor 110a outputs ten-bit data 70a while recording lower-bit data 125 in the recording medium 24. The γ corrector 126 nonlinearly transforms the ten-bit data 70a to thereby output eight-bit data 128, which is represented by a curve 128 in FIG. 8A. The 10/8 processor 150 linearly transforms the ten-bit data 70a to thereby output eight-bit data 152 while recording the two lower bits cut off in the recording medium 24 as lower-bit data 160. Parameters 162 include the ordinal numbers of the linear processor 110a and γ processor 126 in order to show correspondence between the difference data 125, 160 and 156 and the sources 110a, 150 and 126. Parameters 162 are also recorded in the recording medium 24 via signal lines 25a, 25c and 25d.

By applying the subfile 32b consisting of the difference data and parameters stated above to software processing later, it is possible to fully reproduce the data 70a and therefore the original data 22a.

The present invention may, of course, execute any suitable nonlinear processing other than γ correction shown and described. While the illustrative embodiment records the files in the recording medium 24 mounted on the camera, they may be transferred to a recording medium remote from the camera by a wired or a wireless communication channel. In this sense, the recording medium 24 is not essential with the present invention.

In summary, an image data recording apparatus of the present invention is adaptive to a standard file format available for image data. Also, the apparatus of the present invention records a difference file cut off at a processing stage and a parameter representative of a source from which the difference file is derived and thereby allows data having a broad dynamic range to be fully reproduced by software later by using the parameter. That is, original image data can be effectively used.

Further, the difference data derived from linear processing makes data processing circuitry simple and has a small size feasible for a system. Moreover, when the number of bits is reduced by nonlinear processing, a difference between the processed data and data identical in the number of bits with the processed data, but derived from original data, is produced. This difference data has small size and saves a memory space.

The entire disclosure of Japanese patent application No. 2000-343456 filed on Nov. 10, 2000, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A method of processing image data by a processor performing the steps of:
    converting first image data having a first number of bits to second image data having a second number of bits less than the first number of bits;
    inversely converting the second image data having the second number of bits to thereby output inversely converted second image data having the first number of bits;
    calculating a difference between the information represented by each of the bits of the first image data and the information represented by each of the bits of the inversely converted second image data and outputting the difference as first difference data; and
    generating a file including the first difference data and a first parameter, the first parameter identifying the first difference data as being calculated using the first image data and the inversely convened second image data, wherein
    each bit of image data represents a quantizing level, of image data.

2. The method in accordance with claim 1, further comprising the step of recording the file.

3. The method in accordance with claim 1, wherein the first image data can be reproduced by adding the first difference data to the inversely convened second image data.

4. The method in accordance with claim 1, wherein
    said step of converting comprises the sub-step of linearly converting the first number of bits of the first image data to the second number of bits, and said step of inversely converting comprises the sub-step of linearly, inversely converting the second number of bits of the second image data to the first number of bits.

5. The method in accordance with claim 1, wherein
    said step of converting comprises the sub-step of nonlinearly converting the first number of bits of the first image data to the second number of bits, and said step of inversely converting comprise the sub-step of nonlinearly, inversely converting the second number of bits of the second image data to the first number of bits.

6. A method of processing image data by a processor performing the steps of:
    converting first image data having a first number of bits to second image data having a second number of bits, less than the first number of bits;
    inversely converting the second image data having second number of bits to thereby output inversely converted second image data having the first number of bits;
    calculating a difference between the information represented by each of the bits of the first image data and the information represented by each of the bits of the inversely convened second image data and outputting the difference as first difference data; and
    generating a file including the first difference data and a first parameter, the first parameter identifying the first difference data as being calculated using the first image data and the inversely convened second image data, wherein
    said step of converting comprises the sub-step of reducing the first number of bits of the first image data beginning with a least significant bit and continuing in sequence from the least significant bit towards higher order bits until the number of bits of the first image data becomes equal to the second number of bits of the second image data, and said step of inversely converting comprises the sub-step of adding ZERO bits to the least significant bit of the second image data until the number of bits of the second image data becomes equal to the first number of bits of the first image data, wherein
    each bit of image data represents a quantizing level of image data.

7. The method in accordance with claim 6, further comprising the step of recording the file.

8. The method in accordance with claim 6, wherein the broad-range the first image data can be reproduced by adding the first difference data to the inversely converted second image data.

9. An apparatus for recording image data comprising at least one image processing circuitry and a storage, said at least one image processing circuitry comprising:
    a converting circuit for converting input first image data having a first number of bits to output second image data having a second number bits, less than the first number of bits, and feeding the output second image data to another image processing circuitry;
    an inverse convening circuit for inversely converting the second image data having the second number of bits to thereby produce inversely converted second image data having the first number of bits;
    a calculating circuit for calculating a difference between the information represented by each of the bits of the input first image data and the information represented by each of the bits of the inversely convened second image data and outputting the difference as first difference data; and
    a file generating circuit for generating a file including the first difference data and a first parameter, the first parameter identifying the first difference data as being calculated using the first image data and the inversely converted second image data, wherein
    each bit of image data represents a quantizing level of image data.

10. The apparatus in accordance with claim 9, wherein said converting circuit comprises a linear converting circuit for linearly converting the first number bits of the first image data to the second number of bits, and said inverse converting circuit comprises a liner inverse converting circuit for linearly, inversely converting the second number of bits of the second image data to the first number of bits.

11. The apparatus in accordance with claim 9, wherein said converting circuit comprises a nonlinear convening circuit for nonlinearly converting the number of bits of the first image data to the second number of bits, and said inverse converting circuit comprises a nonlinear inverse converting circuit for nonlinearly, inversely converting the number of bits of the second image data to the first number of bits.

12. An apparatus for recording image data comprising at least one image processing circuitry and a storage, said at least one image processing circuitry comprising:

a converting circuit for converting input first image data having a first number of bits to output second image data having a second number of bits, less than the first number of bits, and feeding the output second image data to another image processing circuitry;

an inverse converting circuit for inversely converting the second image data having the second number of bits to thereby produce inversely converted second image data having the first number of bits;

a calculating circuit for calculating a difference between the information represented by each of the bits of the input first image data and the information represented by each of the bits of the inversely converted second image data, both having the first number of bits, and outputting the difference as first difference data; and a file generating circuit for generating a file including the first difference data and a first parameter, the first parameter identifying the first difference data as being calculated using the first image data and the inversely converted second image data, wherein each bit of image data represents a quantizing level of image data, and said converting circuit comprises a circuit for reducing the first number of bits of the first image data beginning with a least significant quantizing bit and continuing in sequence from the least significant bit towards higher order bits until the number of bits of the first image data becomes equal to the second number of bits of the second image data, and said inverse converting circuit comprises a circuit for adding ZERO bits to the least significant bit of the second image data until the number of bits of the second image data becomes equal to the first number of bits of the first image data.

* * * * *